(12) United States Patent
Kikuchi et al.

(10) Patent No.: US 7,626,897 B2
(45) Date of Patent: Dec. 1, 2009

(54) OPTICAL PICKUP, OPTICAL DISC DEVICE AND METHOD FOR MANUFACTURING OPTICAL PICKUP

(75) Inventors: Atsuo Kikuchi, Tokyo (JP); Kazuyuki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 245 days.

(21) Appl. No.: 10/579,797

(22) PCT Filed: Sep. 26, 2005

(86) PCT No.: PCT/JP2005/018211

§ 371 (c)(1),
(2), (4) Date: May 18, 2006

(87) PCT Pub. No.: WO2006/035950

PCT Pub. Date: Apr. 6, 2006

(65) Prior Publication Data

US 2007/0153645 A1 Jul. 5, 2007

(30) Foreign Application Priority Data

Sep. 27, 2004 (JP) ............................ 2004-279964

(51) Int. Cl.
*G11B 7/00* (2006.01)
(52) U.S. Cl. ................ 369/44.23; 369/112.01
(58) Field of Classification Search ............ 369/112.01, 369/44.23
See application file for complete search history.

(56) References Cited

U.S. PATENT DOCUMENTS

| 4,789,978 A * | 12/1988 | Shikama et al. ......... 369/112.23 |
| 4,812,638 A * | 3/1989 | Ogata et al. ............. 250/201.5 |
| 5,280,464 A * | 1/1994 | Itoh et al. ................ 369/44.23 |
| 2001/0028625 A1* | 10/2001 | Asada et al. ............ 369/112.24 |
| 2002/0176331 A1* | 11/2002 | Ariyoshi et al. .......... 369/44.23 |
| 2005/0002289 A1* | 1/2005 | Mori ....................... 369/44.23 |

FOREIGN PATENT DOCUMENTS

| JP | 62-132247 | 6/1987 |
| JP | 4-092236 | 3/1992 |
| JP | 7-270717 | 10/1995 |

* cited by examiner

*Primary Examiner*—Wayne R Young
*Assistant Examiner*—Linh T Nguyen
(74) *Attorney, Agent, or Firm*—Oblon, Spivak, McClelland, Maier & Neustadt, L.L.P.

(57) ABSTRACT

An optical pickup is provided which is capable of minimizing an astigmatism thereof with a simple configuration. The optical pickup includes a collimate lens for transferring optical beams outputted from a laser diode to parallel light, and an objective lens for collecting the optical beams transferred to parallel light with the collimate lens and applying the optical beams to an optical disk, wherein mounting angles of the collimate lens and the objective lens are adjusted so that astigmatisms of the collimate lens and the objective lens may be offset by each other. Thus the astigmatism of the optical pickup can be minimized with a simple configuration without need for separately providing an element for correcting aberration.

7 Claims, 7 Drawing Sheets

|  | WITH ASTIGMATISM OFFSET | | WITHOUT ASTIGMATISM OFFSET | |
|---|---|---|---|---|
|  | 0AS | 45AS | 0AS | 45AS |
| average | -0.2 | 0.1 | 0.0 | 0.0 |
| σ | 11.3 | 11.7 | 9.1 | 7.8 |
| ave+3σ | 33.9 | 35.2 | 27.4 | 23.4 |
| ave-3σ | -34.2 | -35.0 | -27.4 | -23.4 |

[λrms]

FIG. 9

OPTICAL PICKUP, OPTICAL DISC DEVICE AND METHOD FOR MANUFACTURING OPTICAL PICKUP

TECHNICAL FIELD

The present invention relates to an optical pickup, an optical disk apparatus and a manufacturing method for the optical pickup, and is optimum to application to an optical disk apparatus by irradiating optical beam to the optical disk for access.

BACKGROUND ART

An optical pickup of an optical disk apparatus has the following problem: a large astigmatism of an objective lens outgoing side spot will degrade record/playback characteristics on an optical disk.

As one of correcting such an astigmatism, there is proposed a method of adjusting collimation with an anamorphic prism provided between a collimate lens and an objective lens (for example, refer to Patent Document 1, from the 1st line in the left upper column to the 2nd line in the right upper column at Page 2).

Patent Document 1 Japanese Patent Laid-Open No. 64-76011

However, the above-mentioned method of correcting astigmatism with the anamorphic prism has the following problem: the anamorphic prism causes the optical pickup to be complicated and enlarged.

Furthermore, fine adjustment of an angle of an erecting mirror for erecting optical beams perpendicularly to the optical disk can correct the astigmatism, however, this requires an adjusting mechanism for varying the angle of the erecting mirror. Accordingly, there is a problem of the fine adjustment method not being applied to a thin type optical pickup.

DISCLOSURE OF THE INVENTION

In view of the above-mentioned problem in the conventional technique, it is an object of the present invention to provide an optical pickup, an optical disk apparatus and a manufacturing method for the optical pickup with a simple structure.

To address such problems, the optical pickup according to the present invention includes a collimate lens for transferring optical beams outputted from a light source to parallel light and an objective lens for collecting the optical beams transferred to parallel light by the collimate lens and applying the beams to the optical disk, wherein mounting angles of the collimate lens and the objective lens are adjusted so that astigmatisms of the collimate lens and the objective lens may be offset by each other.

The astigmatism of each of the collimate lens and the objective lens is measured and mounting angles of the collimate lens and the objective lens are adjusted so that the astigmatisms of the collimate lens and the objective lens may be offset by each other, thus minimizing the astigmatism of the optical pickup with a simple configuration without need for providing means of correcting aberration.

The optical disk apparatus according to the present invention includes a collimate lens for transferring optical beams outputted from a light source to parallel light and an objective lens for collecting the optical beams transferred to parallel light by the collimate lens and applying beams to the optical disk, wherein mounting angles of the collimate lens and the objective lens are adjusted so that the astigmatisms of the collimate lens and the objective lens may be offset by each other.

An astigmatism of each of the collimate lens and the objective lens is measured and mounting angles of the collimate lens and the objective lens are adjusted so that the astigmatisms of the collimate lens and the objective lens may be offset by each other, thus minimizing the astigmatism of the optical pickup with a simple configuration without need for providing means of correcting aberration.

A manufacturing method for an optical pickup according to the present invention includes: measurement of an astigmatism of a collimate lens for transferring the optical beams outputted from a light source to parallel light and an astigmatism of the objective lens for collecting the optical beams transferred to the parallel light by a collimate lens and applying the beams to an optical disk, and adjustment of mounting angles of the collimate lens and the objective lens so that astigmatisms of the collimate lens and the objective lens themselves may be offset by each other based on the measured astigmatism of each of the collimate lens and the objective lens in mounting the collimate lens and the objective lens on the optical pickup.

An astigmatism of each of the collimate lens and the objective lens is measured and mounting angles of the collimate lens and the objective lens are adjusted so that the astigmatisms of the collimate lens and the objective lens may be offset by each other, thus minimizing the astigmatism of the optical pickup with a simple configuration without need for providing means of correcting aberration.

The present invention provides restraint of an astigmatism of the optical pickup with a simple configuration without additional attachment of means of correcting aberration.

BEST MODE FOR CARRYING OUT THE INVENTION

One embodiment of the present invention will be described in detail with reference to the accompanying drawings.

(1) Overall Configuration of Optical Disk Apparatus

Figure 1:
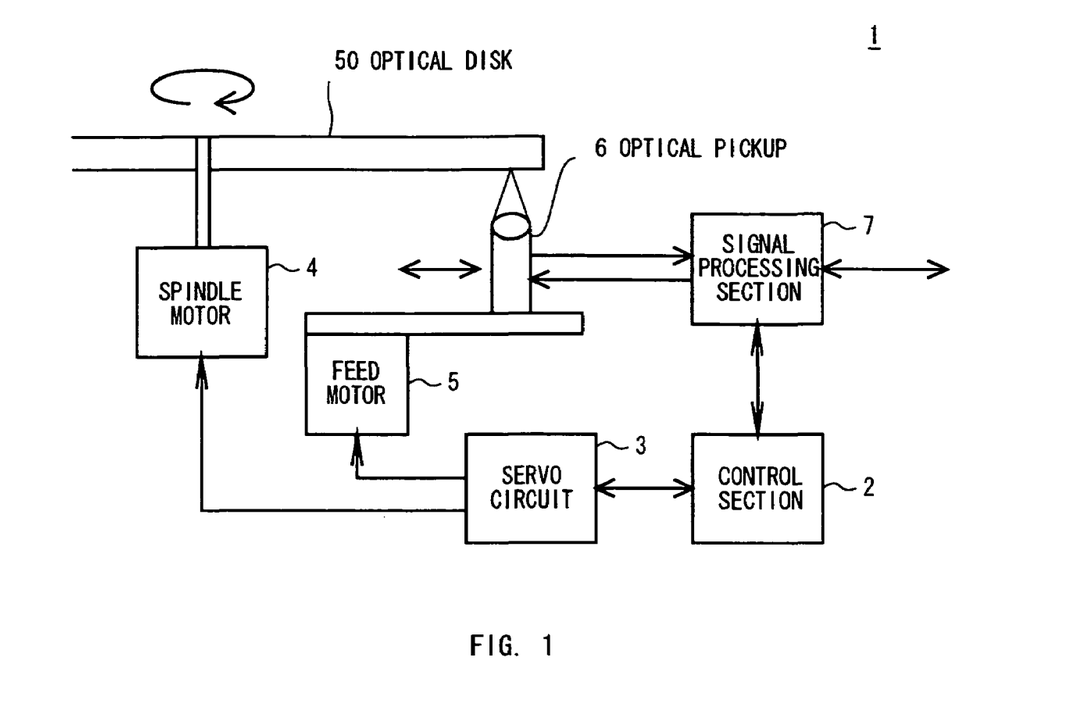
FIG. 1 is a block diagram illustrating a configuration of an optical disk apparatus.

In FIG. 1, a reference numeral 1 denotes an optical disk apparatus and a control section 2 controls each part of the optical disk apparatus 1.

That is, the control section 2 rotates a spindle motor 4 through a servo circuit 3 and rotatingly drives an optical disk 50 placed on a turn table (not illustrated). Moreover, the control section 2 rotates a feed motor 5 through the servo circuit 3 and moves an optical pickup 6 in the radial direction of the optical disk 50. Furthermore, the control section 2 controls a signal processing section 7 and executes data read/write from and into the optical disk 50.

Besides, the control section 2 controls a lens drive of the optical pickup 6 and drives the objective lens of the optical pickup 6 in the tracking direction and the focus direction.

Figure 2:
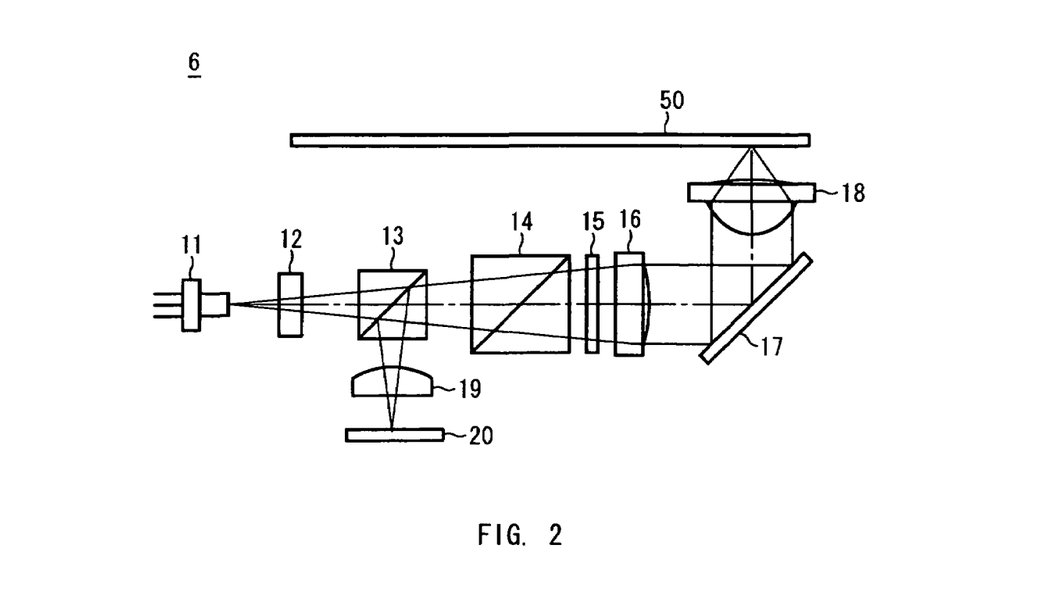
FIG. 2 is a block diagram illustrating a configuration of an optical pickup.

FIG. 2 illustrates a configuration of the optical pickup 6, and a laser diode 11 emits optical beams in response to driving current supplied from the signal processing section 7 (FIG. 1) and inputs the beams into a collimate lens 16 through a grating 12, a deflected beam splitter 13, a beam splitter 14 and a wave plate 15.

The collimate lens 16 transfers optical beams into parallel light and inputs the light into the objective lens 18 through an erecting mirror 17. The objective lens 18 collects and applies the optical beams to the optical disk 50 as outgoing optical beams.

The objective lens 18 receives reflected optical beams reflected by the optical disk 50 and inputs the beams into a photo detector 20 through the erecting mirror 17, the collimate lens 16, the wave plate 15, the beam splitter 14, the deflected beam splitter 13 and a collective lens 19 in order. The photo detector 20 photoelectrically transduces the reflected optical beams, produces various types of signals and supplies the signals to the signal processing section 7 (FIG. 1).

(2) Astigmatism Adjustment of Optical Pickup

Figure 3:
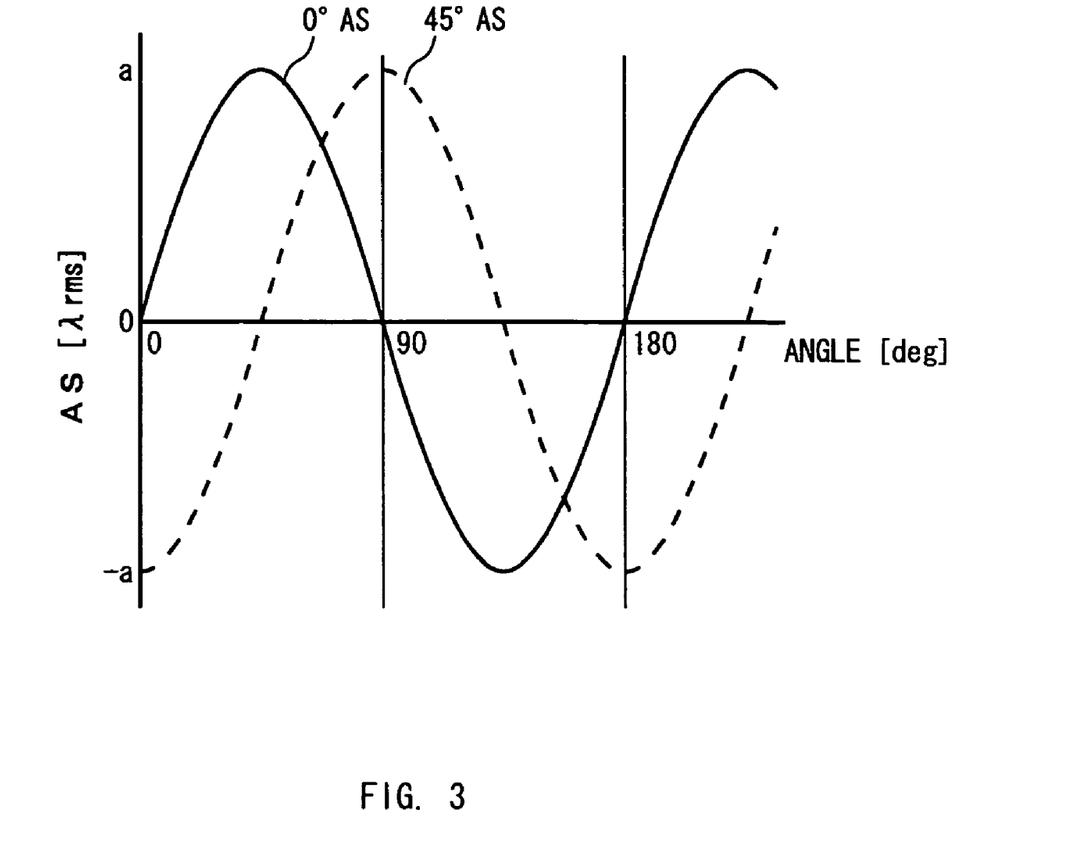
FIG. 3 is a characteristic curve diagram illustrating an astigmatism of an optical pickup.

Next, an adjustment method for an astigmatism of the optical pickup 6 according to the present invention will be described below. The astigmatism of the optical pickup 6, as illustrated in FIG. 3, can be decomposed into a 0° direction astigmatism component (hereinafter referred to as a 0° AS) in the perpendicular direction to radial and tangential directions of the optical disk 50 and a 45° direction astigmatism component (hereinafter referred to as a 45° AS) in 45° inclined direction to the radial and tangential directions. 0° AS and 45° AS consists of sinewaves of which phases are shifted by 45° from each other and can be expressed by the following equations:

$$0° AS = a \times \mathrm{Sin}(2\theta)$$

$$45° AS = a \times \mathrm{Cos}(2\theta) \qquad (1)$$

0° AS mainly has an effect of a RF signal in the jitter direction, while 45° AS mainly has effect in the wobble direction.

Figure 8:
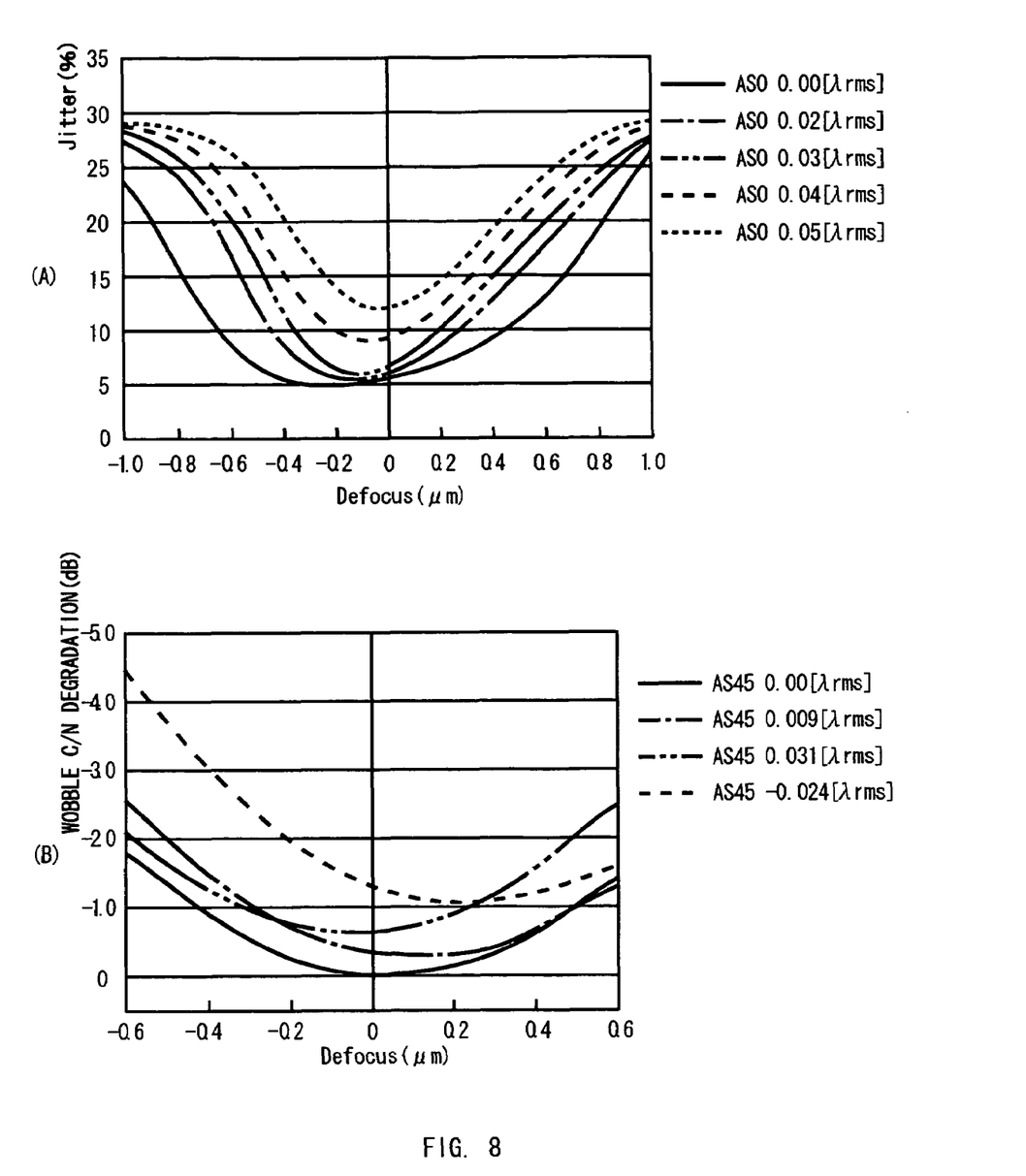
FIG. 8 is a characteristic curve diagram describing an effect by an astigmatism.

That is, FIG. 8(A) illustrates a jitter of the RF signal when 0° AS is changed with 45° AS fixed at 0 [λms] and indicates that the jitter increases more as 0° AS increases. Because the jitter increases more as defocus amount becomes larger, a margin of the jitter against defocus decreases if 0° AS increases.

On the other hand, FIG. 8(B) indicates a wobble C/N when 45° AS is changed with 0° AS fixed at 0.003 [λms] and indicates that the wobble C/N is deteriorated more as 45° AS increases. In this case as well, a margin of the wobble C/N against defocus decreases if 45° AS increases.

Figure 4:
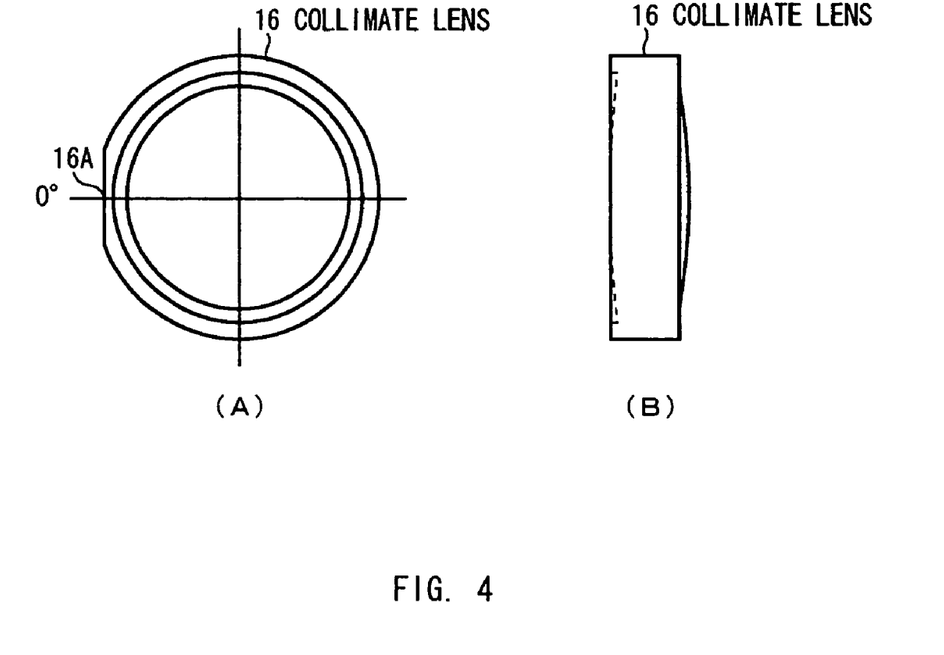
FIG. 4 is a schematic diagram illustrating an outline of a collimate lens.
Figure 5:
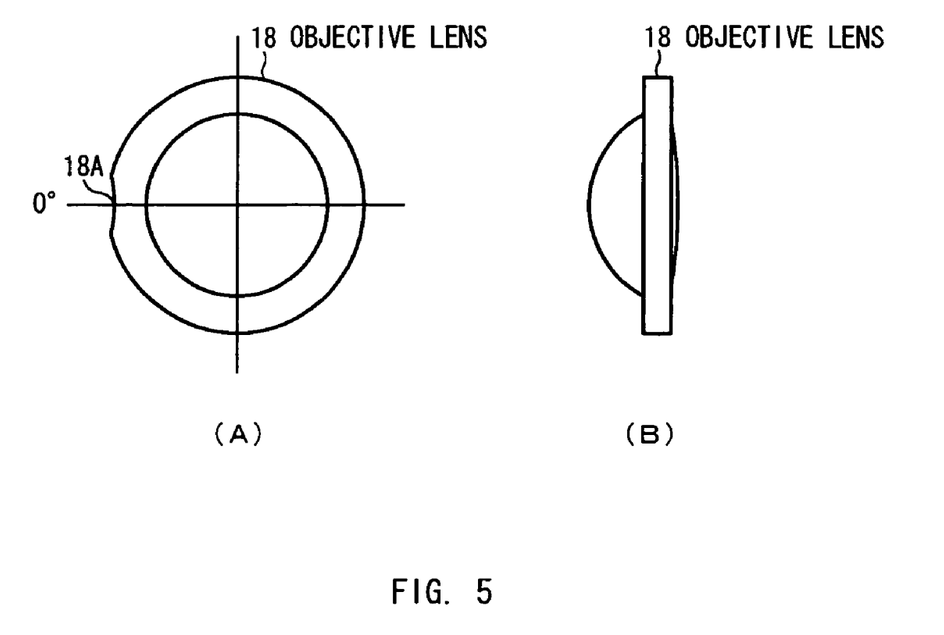
FIG. 5 is a schematic diagram illustrating an outline of an objective lens.

Generally, the astigmatism in the optical pickup predominantly results from an objective lens and a collimate lens. FIG. 4 and FIG. 5 illustrate the collimate lens 16 and the objective lens 18 of the optical pickup 6, both of which are formed by injection-molding resin such as polycarbonate. A lens formed by means of injection molding has the more difficulty in owning a small astigmatism than a lens manufactured by polishing optical glass. Accordingly, for the optical pickup 6 according to the present invention, the objective lens 18 and the collimate lens 16 are disposed so that astigmatisms in the 0° direction and the 45° direction may be offset by each other, that is, opposite polarities may be obtained, thus reducing the astigmatism in the whole optical pickup 6.

Astigmatisms of the objective lens 18 and the collimate lens 16 can be decomposed into 0° AS and 45° AS described above, respectively. If a rotational angle obtained when a lens is rotated is taken as θ', the astigmatism of the lens can be expressed using the following expression:

$$0° AS = a \times \mathrm{Sin}(2(\theta + \theta'))$$

$$45° AS = a \times \mathrm{Cos}(2(\theta + \theta')). \qquad (2)$$

Figure 6:
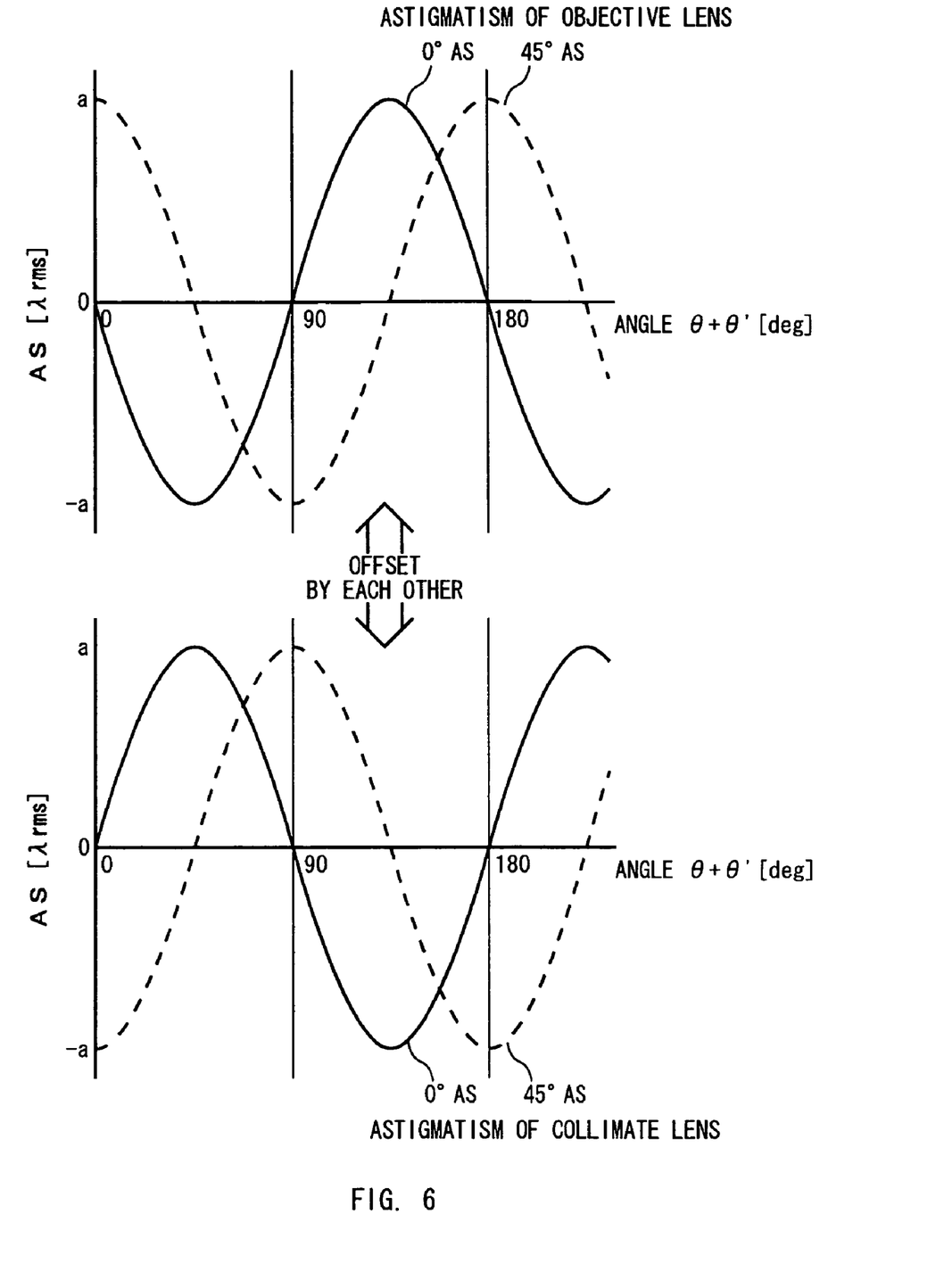
FIG. 6 is a characteristic curve diagram illustrating a relationship between astigmatisms of an objective lens and a collimate lens.

As illustrated in FIG. 6, if a rotational angle θ' of each of the objective lens 18 and the collimate lens 16 is set so that 0° AS and 45° AS of the collimate lens 16 may be zero and −a respectively when 0° AS and 45° AS of the objective lens 18 are zero and a, the astigmatisms of 0° AS and 45° of the objective lens 18 and the collimate lens 16 are offset by each other, thus reducing the astigmatism of the whole optical pickup 6.

As described above, the collimate lens 16 and the objective lens 18 are formed by injection molding, each of which has a gate 16A (FIG. 4) and a gate 18A (FIG. 5) for resin injection. Moreover, the gates 16A and 18A can be placed at setting reference positions of the rotational angle θ'.

(3) Manufacturing Method for Optical Pickup

Next, a manufacturing method for the optical pickup 6 will be described, mainly on setting of the rotational angle θ' of the objective lens 18 and the collimate lens 16 mentioned above, using a flow chart shown in FIG. 7.

Figure 7:
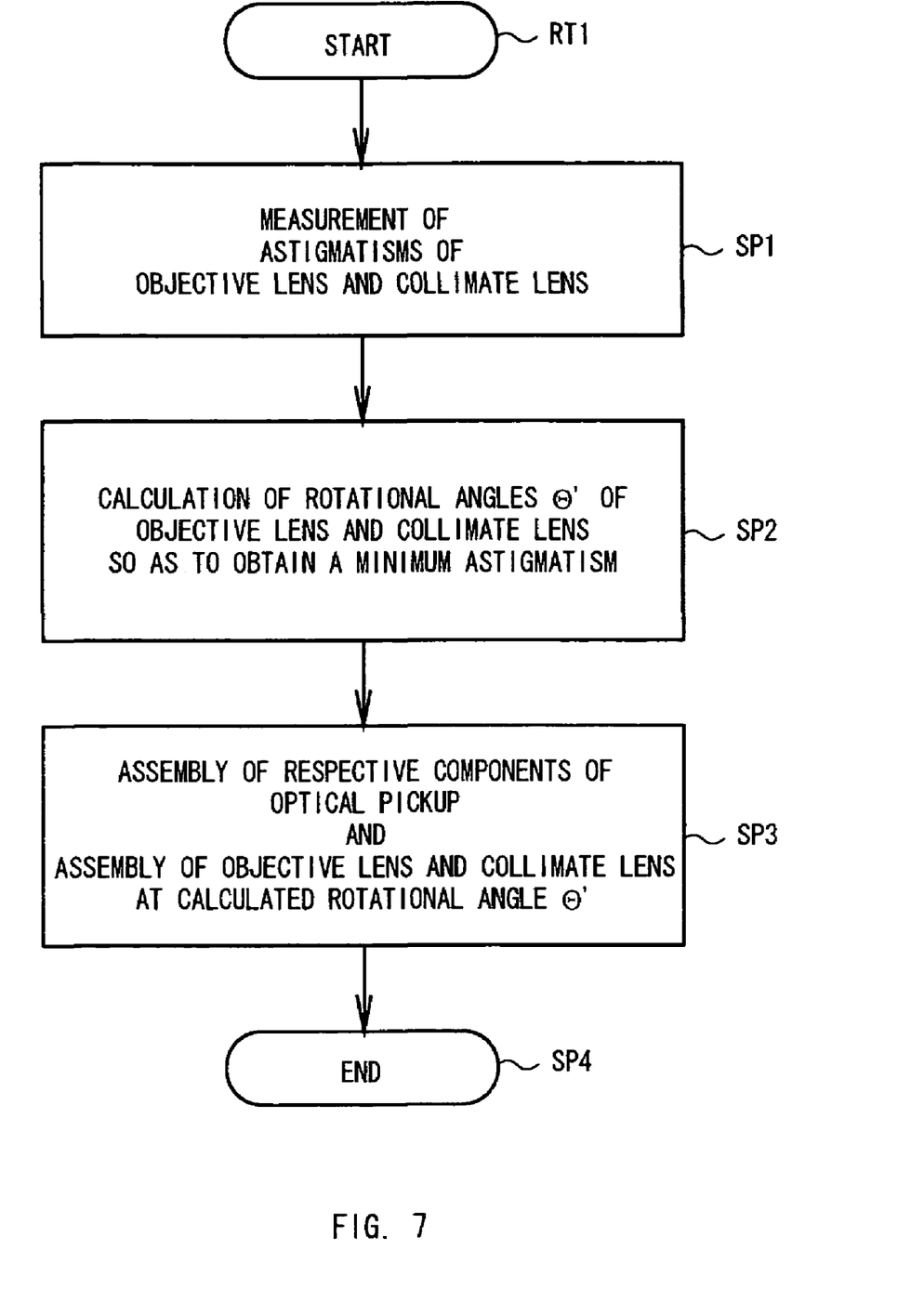
FIG. 7 is a flow chart illustrating a manufacturing procedure of an optical pickup.

Manufacture of the optical pickup 6 is started at a starting step of a manufacturing process routine RT1 and moved to a step SP1 to measure the respective astigmatisms (0° AS and 45° AS) of the objective lens 18 and the collimate lens 16 and moved to the next step SP2.

In the step SP2, such a rotational angle θ' of each of the objective lens 18 and the collimate lens 16 that both of the astigmatisms of 0° AS and 45° AS of the whole optical pickup 6 become minuscule in number is calculated on the basis of values of the measured astigmatisms of the objective lens 18 and the collimate lens 16 and the process moves to the next step SP3.

In the step SP3, respective components of the optical pickup 6 are assembled on a base (not illustrated). At this time, the objective lens 18 and the collimate lens 16 are respectively assembled at rotational angles θ' calculated in advance and the process moves to the next step SP4, thus completing the manufacturing process.

(4) Operation and Advantages

With the above configuration, in the optical pickup 6 the astigmatism of each of the objective lens 18 and the collimate lens 16 which are main factors of the astigmatisms is measured in advance. In manufacturing the optical pickup 6, the objective lens 18 and the collimate lens 16 are assembled so that the astigmatisms of 0° AS and 45° AS of the objective lens 18 and the collimate lens 16 may be offset by each other, namely, so as to obtain a reversed polarity.

This permits the optical pickup 6 to adjust an astigmatism as the whole optical pickup to its minimum. In assembling the objective lens 18 and the collimate lens 16 into the optical pickup 6, it is sufficient that either of the objective lens 18 or the collimate lens 16 is fixed in advance and the astigmatisms of both of them are offset by each other by adjusting a mounting angle of the other lens.

Figure 9:
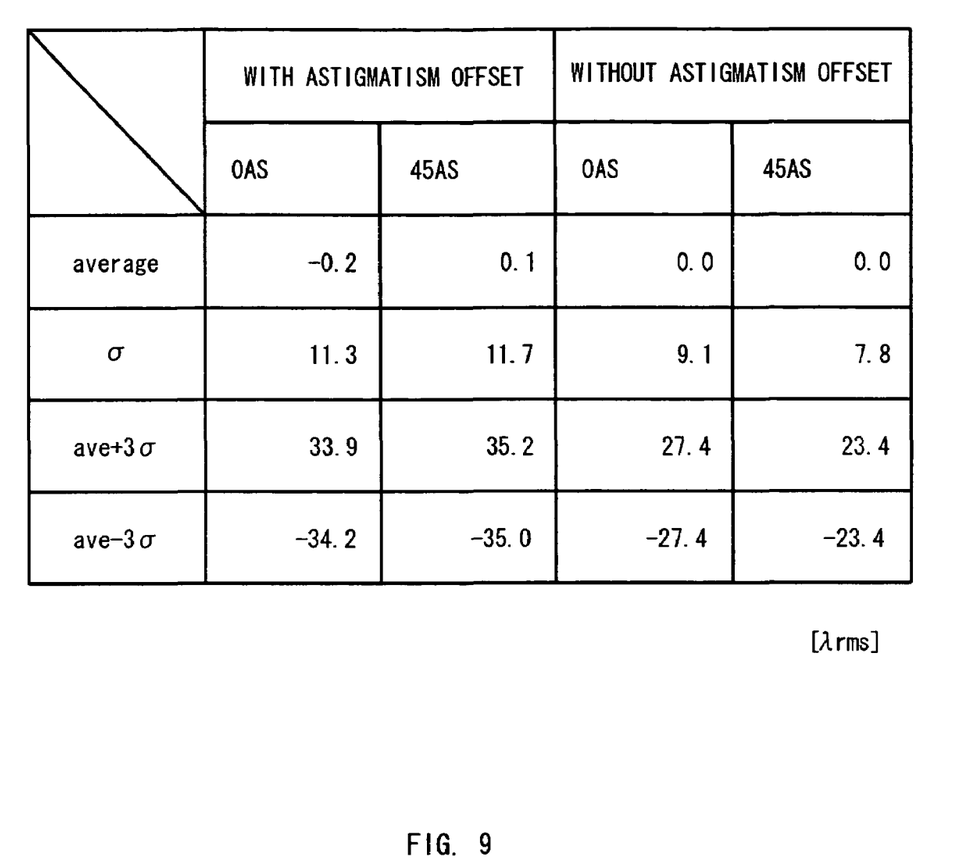
FIG. 9 is a table showing an improvement status of an astigmatism by an astigmatism adjustment method according to the present invention.

FIG. 9 shows average values and standard deviations of astigmatisms when the astigmatisms are offset using the astigmatism adjusting method according to the present invention, and simulated values of average values and standard deviations of the astigmatisms when no astigmatisms are offset. This figure indicates that the average value of the astigmatism is restrained to 0 [λrms] with the astigmatism offset and the standard deviation of the astigmatism as well is reduced.

As described above, it is difficult for lens by injection molding to reduce the astigmatism. However, the optical pickup 6 according to the present invention eliminates development of the necessity of minimizing the astigmatisms of the objective lens 18 and the collimate lens 16 by compensating for the astigmatisms of these lenses each other.

It is good that the astigmatism of the whole optical pickup 6 becomes small. Accordingly, the astigmatisms of the objective lens 18 and the collimate lens 16 can be developed so as to have the same value, thus providing a high advantage in manufacturing lens.

With the above configuration, the objective lens 18 and the collimate lens 16 of the optical pickup 6 are mounted so that the astigmatisms thereof may be offset by each other, thus minimizing the astigmatism of the optical pickup 6.

(5) Other Embodiments

In the above-mentioned embodiment, the objective lens 18 and the collimate lens 16 of the optical pickup 6 are mounted so that the astigmatisms thereof may be offset by each other to minimize the astigmatism of the whole optical pickup 6, however, the present invention is not limited to the embodiment described above and the astigmatism of the whole optical pickup 6 may be adjusted to an arbitrary value.

In the optical disk apparatus, the presence of a little astigmatism sometimes provides more margin improvement in practice during record or playback. In such a case, adjustment of mounting angles of the objective lens 18 and the collimate lens 16 can create the astigmatism of the whole optical pickup 6 into a desired value.

INDUSTRIAL APPLICABILITY

The present invention can apply to various types of optical disks for performing record thereon and playback therefrom.

DESCRIPTION OF SYMBOLS

1 . . . OPTICAL DISK APPARATUS, 2 . . . CONTROL SECTION, 3 . . . SERVO CIRCUIT, 4 . . . SPINDLE MOTOR, 5 . . . FEED MOTOR, 6 . . . OPTICAL PICKUP, 7 . . . SIGNAL PROCESSING SECTION, 11 . . . LASER DIODE, 12 . . . GRATING, 13 . . . DEFLECTED BEAM SPLITTER, 14 . . . BEAM SPLITTER, 15 . . . WAVELENGTH PLATE, 16 . . . COLLIMATE LENS, 17 . . . ERECTING MIRROR, 18 . . . OBJECTIVE LENS, 19 . . . LIGHT-GATHERING LENS, 20 . . . PHOTO DETECTOR, 50 . . . OPTICAL DISK

The invention claimed is:

1. An optical pickup for applying optical beams to an optical disk, comprising:
   a collimate lens configured to collimate optical beams outputted from a light source to parallel light; and
   an objective lens configured to collect the optical beams transferred to parallel light by the collimate lens and applying the beams to the optical disk,
   wherein mounting angles of the collimate lens and the objective lens are configured such that a 0° direction astigmatism of the collimate lens and a 0° direction astigmatism of the objective lens are offset by each other and a 45° direction astigmatism of the collimate lens and a 45° direction astigmatism of the objective lens are offset by each other.

2. The optical pickup according to claim 1, wherein the collimate lens and the objective lens include gates from resin injection, the gates being reference positions for adjusting the mounting angles.

3. An optical disk apparatus for gaining access to an optical disk, comprising:
   a collimate lens configured to collimate optical beams outputted from a light source to parallel light; and
   an objective lens configured to collect the optical beams transferred to parallel light by the collimate lens and applying beams to the optical disk,
   wherein mounting angles of the collimate lens and the objective lens are configured such that a 0° direction astigmatism of the collimate lens and a 0° direction astigmatism of the objective lens are offset by each other and a 45° direction astigmatism of the collimate lens and a 45° direction astigmatism of the objective lens are offset by each other.

4. The apparatus according to claim 3, wherein the collimate lens and the objective lens include gates from resin injection, the gates being reference positions for adjusting the mounting angles.

5. A manufacturing method for an optical pickup for applying optical beams to an optical disk, comprising:
   measuring of an astigmatism of a collimate lens for transferring optical beams outputted from a light source to parallel light and an astigmatism of an objective lens for collecting the optical beams transferred to the parallel light by the collimate lens and applying the beams to the optical disk; and
   adjusting of mounting angles of the collimate lens and the objective lens so that a 0° direction astigmatism of the collimate lens and a 0° direction astigmatism of the objective lens are offset by each other and a 45° direction astigmatism of the collimate lens and a 45° direction astigmatism of the objective lens are offset by each other, based on the measured astigmatism of each of the collimate lens and the objective lens in mounting the collimate lens and the objective lens on the optical pickup.

6. The method according to claim 5, wherein the adjusting includes rotating one of the collimate lens and the objective lens around an axis parallel to the optical beams.

7. The method according to claim 5, wherein the collimate lens and the objective lens include gates from resin injection, and the adjusting includes adjusting the mounting angles of the collimate lens and the objective lens using the gates as reference positions.

* * * * *